United States Patent [19]

Harrison, Jr.

[11] Patent Number: 4,996,820
[45] Date of Patent: Mar. 5, 1991

[54] TAGGING MACHINE FOR SEEDLING TRANSPLANTS

[75] Inventor: Richard F. Harrison, Jr., Calverton, N.Y.

[73] Assignee: Harrison Transplanter Corporation, Calverton, N.Y.

[21] Appl. No.: 467,198

[22] Filed: Mar. 16, 1990

Related U.S. Application Data

[63] Continuation-in-part of Ser. No. 259,795, Oct. 19, 1988, Pat. No. 4,947,579.

[51] Int. Cl.$^5$ .............................................. B27F 7/02
[52] U.S. Cl. ...................................... 53/69; 53/247; 53/252; 53/534; 227/7
[58] Field of Search ................. 53/69, 67, 64, 534, 53/247, 249, 250, 252, 251, 237, 505; 493/91; 227/100, 7

[56] References Cited

U.S. PATENT DOCUMENTS

| | | | |
|---|---|---|---|
| 2,942,392 | 6/1960 | McCain et al. | 53/534 X |
| 3,580,456 | 5/1971 | Zueger et al. | 227/100 |
| 3,780,627 | 12/1973 | Roda | 493/91 |
| 3,846,954 | 11/1974 | Meyers | 53/131 X |
| 4,115,982 | 9/1978 | Sato et al. | 53/534 |
| 4,241,559 | 12/1980 | Klapp | 53/534 X |
| 4,574,556 | 3/1986 | Schmidt et al. | 53/69 |

*Primary Examiner*—James F. Coan
*Attorney, Agent, or Firm*—Hopgood, Calimafde, Kalil, Blaustein & Judlowe

[57] ABSTRACT

The invention comtemplates the automatic tagging of seedling transplants which have been or are about to be inserted in the prepared soil within individual cells of matrices (e.g. 3×4 matrices of cells). The tags are stacked and retained in individual vertically extending magazines which are above and in transversely spaced array, across the path of the row-by-row indexed conveyor advance of each successive matrix. The tags of each stack are retained by lateral side-edge lug formations of each magazine, at the otherwise open bottom end of the magazine. A tag-picker arm carries an elastomeric suction cup which is configurated, in its horizontal pick-off relation with the bottom face of the bottom tag, to engage and arcuately deform the tag, thus removing or decreasing magazine-lug restraint and affording an initial extracting displacement wherein the arched tag can be downwardly displaced, essentially without shear or other interaction with the next-adjacent and other remaining tags in the magazine. The tag-picker arm is mounted for a cycle of substantially 90° rotary displacement whereby the extraced tag is reoriented, from the essentially horizontal plane of its retention in and extraction from the stack, to essentially a vertical-plane orientation, aligned for vertically driven insertion into the soil of its intended plant cell. Great flexibility is afforded for adaptation to plant cells of different size and spacing, for a range of cell matrices in which one or a plurality of cells can be concurrently tagged; this applies to mechanical-adjustment features and to the ready entry of synchronizing and function-timing data into a programmable computer.

24 Claims, 5 Drawing Sheets

TAGGING MACHINE FOR SEEDLING TRANSPLANTS

BACKGROUND OF THE INVENTION

This application is a continuation-in-part of pending original application, Ser. No. 259,795, filed Oct. 19, 1988, now U.S. Pat. No. 4,947,579, and this application includes tagging-machine subject matter non-elected in said original application.

Said original application discloses and describes in detail an automatic machine for picking up seedling plants which have been individually grown in the relatively small cells of first matrices delivered along one conveyor, and then transporting and replanting the seedlings by inserting the same into prepared relatively large cells of second matrices progressing along a second conveyor. Once transplanted, the seedlings advance with the second conveyor to a tagging station, where suitably inscribed identification tags are automatically picked off from plural tag magazines. The number of magazines corresponds to the number and spacing of transplant cells to be individually and concurrently tagged in each cycle of tagging-station operation.

The present application pertains to automatic tagging machines of the character indicated. A presently preferred embodiment is first described, and the embodiment of said original application is also described.

Said original application contains a discussion of prior art pertaining to seedling transplantation, and reference is made to that discussion, there being no need for its repetition at this time. In respect of automatic tagging of seedling transplants, reference is made to L. Schmidt et al. U.S. Pat. No. 4,574,556 and to patents of record therein. The Schmidt et al. machine comprises a plurality of laterally spaced tag magazines in horizontal array such that the tag-release end of each magazine is positioned directly above each plant cell in each row of plant cells that is advanced by a conveyor of cell matrices. An assembly of plural tag-pickers is vertically reciprocated from an upper position of engagement with the dispensing-end tag of each magazine, to slide each tag downwardly out of its magazine and to drive each tag into the soil of the cell it is to identify. The action has its points of similarity to the cycle of a stapling machine, wherein each individual staple is caused to slide from the end location of its magazine, and solely in a rectilineal stroke which is perpendicular to the elongate direction of the supply stack in the magazine.

Operation of the Schmidt et al. automatic tagging machine is less than completely reliable. On occasion, it will fail to extract the end tag in a magazine, or it will extract the end tag plus the tag adjacent thereto, or its vacuum-operated engagement to the end tag will slip in the process of tag extraction, so that tag-insertion in a soil-laden cell will be incomplete or not at all. It is believed that the noted malfunctions which are observable in Schmidt et al. machines may, at least in part be aggravated by the fact that tag-stacking magazine must be in horizontal orientation and that spring-loading is needed for the stack of each magazine, in order to continuously urge the end tag into the magazine-end location from which it must be extracted, in the circumstance of shearing adjacency to the next-succeeding tag.

BRIEF STATEMENT OF THE INVENTION

It is an object of the invention to provide an improved automatic-tagging machine of the character indicated.

A specific object is to meet the above object with basically simple mechanism which can perform a relatively rapid cycle of tag-extraction and implantation, with vastly superior reliability and precision, and avoiding difficulties of prior-art machines.

Another specific object is to meet the above objects with a machine which will perform with currently available identification tags and tag configurations, thus not requiring new special-purpose tag construction.

Still another object, applicable to the preferred embodiment, is to provide a machine of the character indicated wherein tag-extraction from a stacked plurality expressly avoids sliding action between the extracted tag and the next-adjacent tag.

The invention in its preferred embodiment achieves the foregoing objects in a machine wherein the tags of each stack are retained in a substantially vertically oriented magazine with lateral side edges of the bottom tag in slight interference with lug formations at the otherwise open bottom end of the magazine. A tag-picker arm carries an elastomeric suction cup which is configurated, in its horizontal pick-off relation with the bottom face of the bottom tag, to engage and arcuately deform the tag, thus removing or decreasing magazine-lug restraint and affording an initial extracting displacement wherein the arched tag can be downwardly displaced, essentially without shear or other interaction with the next-adjacent and other remaining tags in the magazine. The tag-picker arm is mounted for a cycle of substantially 90° rotary displacement whereby the extracted tag is reoriented, from the essentially horizontal plane of its retention in and extraction from the stack, to essentially a vertical-plane orientation, aligned for vertically driven insertion into the soil of its intended plant cell. Great flexibility is afforded for adaptation to plant cells of different size and spacing, for a range of cell matrices in which one or a plurality of cells can be concurrently tagged; this applies to mechanical-adjustment features and to the ready entry of synchronizing and function-timing data into a programmable computer.

DETAILED DESCRIPTION OF THE INVENTION

The invention will be described in detail in conjunction with the accompanying drawings, in which.

Figure 1:
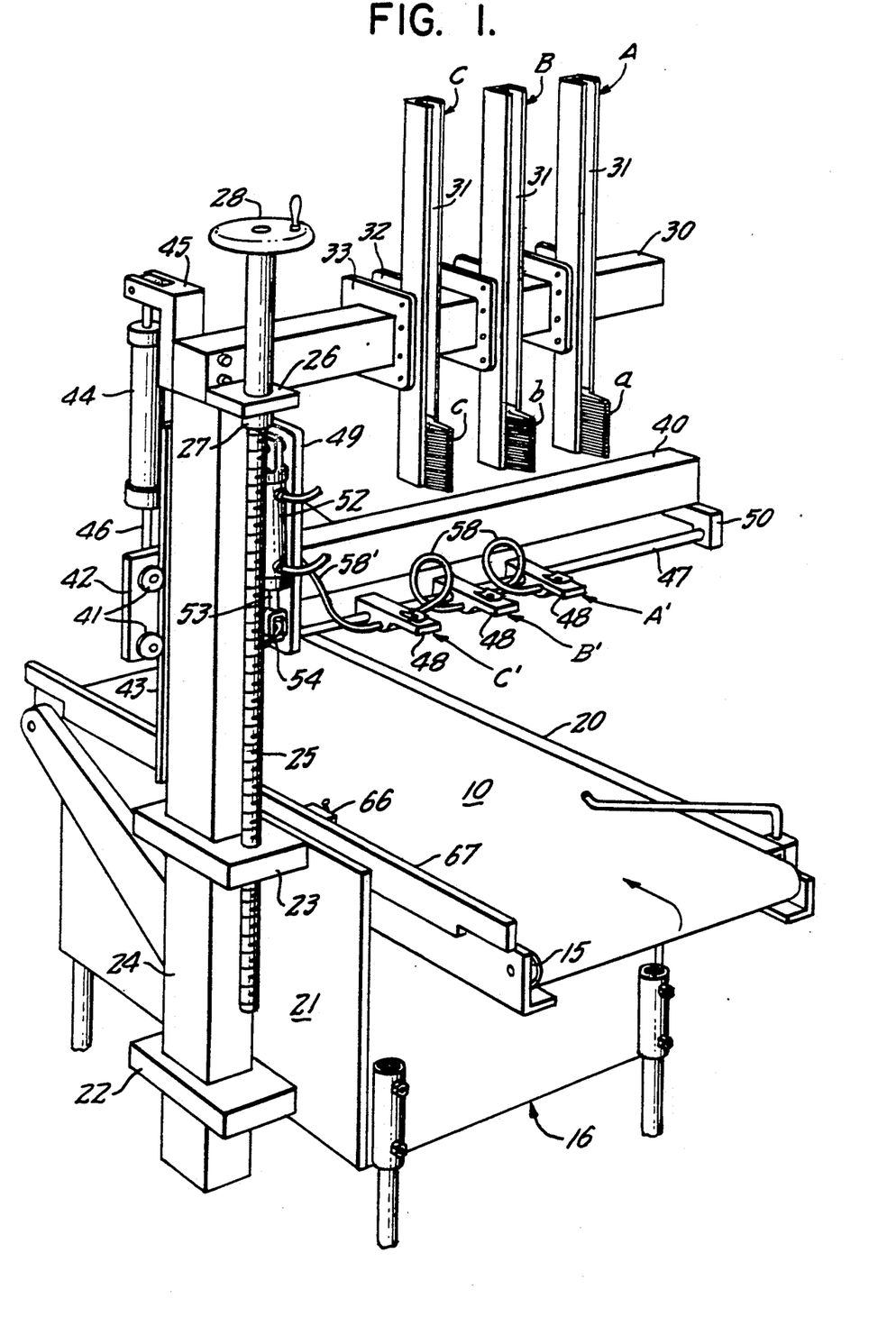
FIG. 1 is a view in three-quarter perspective, showing the presently preferred embodiment of a tagging machine of the invention, looking generally in the direction of conveyor advance through the machine.
Figure 2:
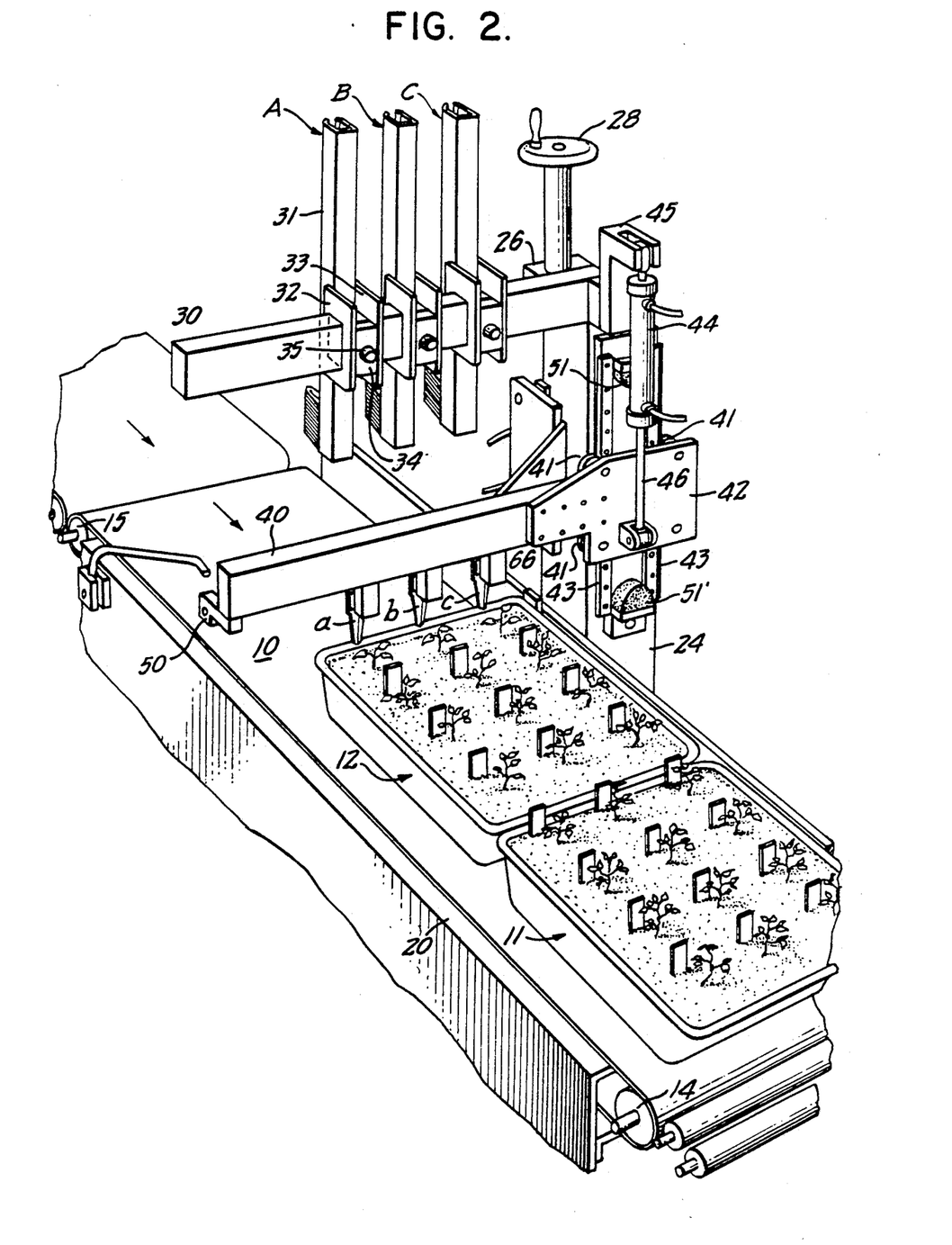
FIG. 2 is another three-quarter perspective of the machine of FIG. 1, taken from an aspect which is substantially opposite the aspect of FIG. 1, and showing last-row cells in a matrix of transplants, just prior to receiving their identification tags.

The tagging machine of FIGS. 1 and 2 is seen to be complete with its own conveyor belt 10 which will be understood to be intermittently indexed for progressive advance of successive trays 11, 12, each of which retains its own 3×4 matrix of cells to be individually tagged by the machine. For simplicity in FIG. 1, no such trays are shown, and in FIG. 2 only the trays 11, 12 are shown, being at the stage where all soil-laden cells have been tagged as at 13, except that the three cells of the last row of cells of tray 12 are shown at the instant immediately preceding their concurrent reception of the insertion ends of tags a,b,c. It matters not whether the cells of trays 11, 12 have received their seedling transplants (as shown), or if they are merely laden with soil, to be tagged first and implanted with seedlings later.

Bench-frame structure which supports end rolls 14, 15 for conveyor belt 10 is shown to comprise a box-like housing 16 with adjustable legs to enable installation of the belt for level transport of trays 11, 12. Housing 16 will be understood to contain various mechanical components, such as a belt-drive motor 17, an air-compressor 18 and a vacuum pump 19, all of which are shown only schematically in FIG. 5. A flanged horizontal plate 20 is part of this structure and provides level support beneath the upper span of belt 10. A substantial side plate 21 is also part of this structure, providing a rugged mount for two vertically spaced guide blocks 22, 23, in which an upstanding column 24 of rectangular section is vertically positionable. A vertical lead screw 25 is in threaded engagement with the upper guide block 23 and is journaled for rotation in an upper bracket 26 at the top end of column 24, being held by a collar 27 against axial displacement with respect to column 24; and a hand wheel 28 provides means for cranked rotation of the lead screw, thus permitting adjustment for vertical elevation of column 24 and two major components which are carried by column 24.

The first of these major components is a rigid horizontal bar member 30, united as by welding to column 24 and extending transverse to the direction of conveyor-belt displacement, and spanning the width of the belt. Bar member 30 is of constant rectangular section, to permit selective assembly of a desired plurality of tag chute or magazine subassemblies A,B,C via the cantilevered outer end of member 30. Each chute subassembly is shown as a vertically elongate channel 31 of constant internal section appropriate for holding commercially available tags in a vertically stacked array; as is customary, each tag comprises a tapering pointed end and a rectangular inscription end, the latter end being received and located by the internal section of the channel, with the pointed end projecting outward, via the slot-like open-mouth side of the channel. Mounting plates 32, 33 are secured to opposite side walls of each channel, and plates 32, 33 are centrally cut to define openings to match and therefore for keying engagement to the sectional contour of bar member 30; a bridge element 34 secures and spaces the horizontally outer limits of plates 32, 33, and knob-headed set screw means 35, threaded to each bridge element 34 provides means for clamping a selected transverse position of each of the subassemblies A,B,C, appropriate to the center-to-center spacing and location of the cells to be served thereby.

The second major component is a second horizontal bar member 40 which also extends transverse to the direction of conveyor-belt displacement and spans the width of the belt. Bar member 40 is guided by four rolls 41 that are journaled in a side plate 42 at four corners of a generally square locus of rolling contacts with spaced vertical guide rails 43 on one face of the vertical column 24; the mount for each roll 41 to side plate 42 is preferably of the eccentrically adjustable variety, so that precise horizontal positioning of bar member 40 may exist, whatever the elevation at which its rolls 41 happen to engage the guide rails 43. A first double-acting cylinder 44, suspended at its upper end from a bracket 45 fixed to column 24 and member 30, has actuator-rod connection 46 to the side plate 42, whereby a first cycle of purely vertical reciprocation may be imparted to the second bar member 40, as will be made clear. Upper and lower shock-absorbing means 51, 51' cushion the limits of vertical reciprocation of bar member 30.

The second bar member 40 pivotally mounts a transverse rod 47 which carries plural tag-picker arms 48. Rod 47 has inboard journaled support in a bracket 49 that is fixed to bar member 40, in spaced proximity to column 24; and a second bracket 50 is removably carried at the cantilevered end of bar member 40, for outboard journaled support of rod 47. A bolted mounting of bracket 50 to bar member 40 is not shown but will be understood to provide selective access to the outer end of rod 47, for purposes of assembly and/or removal of picker arms 48, as needed for the plurality of picker arms appropriate to the transverse spacing and locations of cells to be tagged; the picker-arms 48 of FIG. 2 are shown at transversely spaced locations A',B',C', consistent with the locations of tag stacks a,b,c in the respective tag chutes of magazines A,B,C. Actuating rotary-reciprocating cycles of picker-arm rotation are governed by a second double-acting cylinder 52 that is suspended from a top-end connection to bracket 50 and having an actuating rod connection 53 to a crank 54 at the inboard end of rod 47, as will become more clear from further reference to FIGS. 3 and 3A.

Figure 3:
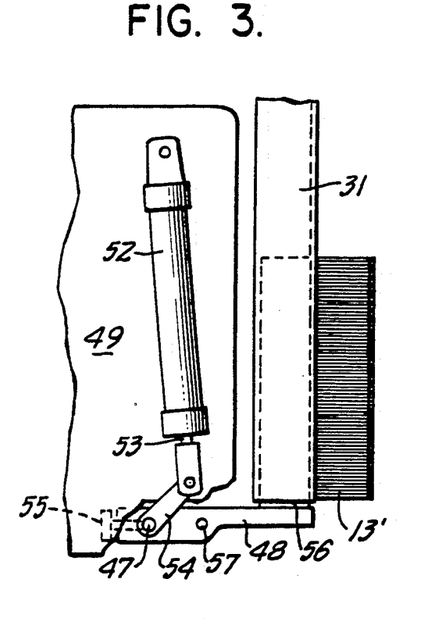
FIG. 3 is an enlarged fragmentary view in side elevation to illustrate a tag-picker arm of the machine of FIGS. 1 and 2, in its raised, tag-picking position.
Figure 3A:
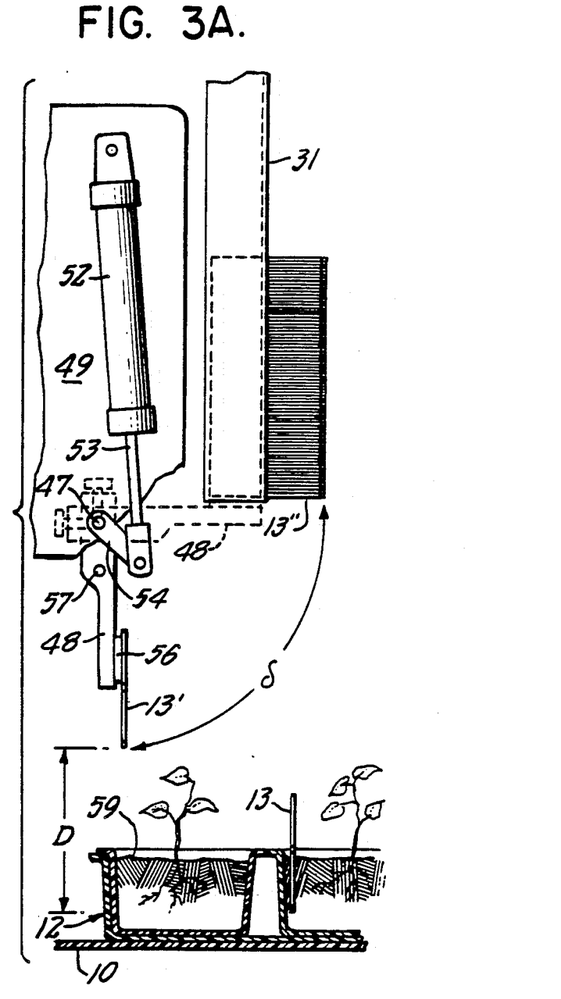
FIG. 3A is a view similar to FIG. 3 to illustrate the mechanism of FIG. 3 in its lowered, tag-reorienting position, poised for cell-implanting displacement.

In FIG. 3, a picker arm 48 is shown clamped to rod 47, as by a knob-headed set screw 55, and an elastomeric suction cup 56 at the outer end of arm 48 is in its "up" position of engagement to the inscribed panel portion of the lowermost tag 13' of the stack contained in magazine 31; a side port 57 in each picker arm serves for vacuum communication to the concavity of suction cup 56, and the side ports 57 of all picker arms are interconnected to each other and to the vacuum pump 19 by flexible hose means, as at 58, 58' in FIG. 1, it being understood that the outermost side port of the outermost picker arm 48 (location A') will have been plugged, to enable like application of vacuum conditions to all suction cups. In FIG. 3A, picker arm 48 has been actuated by the "down" stroke of rod connection 53 to crank 54 for a downward rotary displacement δ, of substantially 90°, initially extracting tag 13' from its horizontal orientation (dashed outline 48' of the picker arm) in the stack and reorienting the same into the essentially vertical orientation shown in solid outline (48 and 13'), in readiness for the downward tag-implanting stroke D, of actuator 44 and its actuating-rod connection 46 to the second bar member 40. Upon tag implantation in the soil 59 of an aligned cell, the vacuum condition is terminated, and in making their respective return strokes, actuator 44 restores the vertically "up" position of the second bar member 40, and actuator 52 restores the horizontal "up" position of picker-arm engagement (via suction cup 56) to the underside of the next-succeeding tag 13" in the stack.

Figure 4:
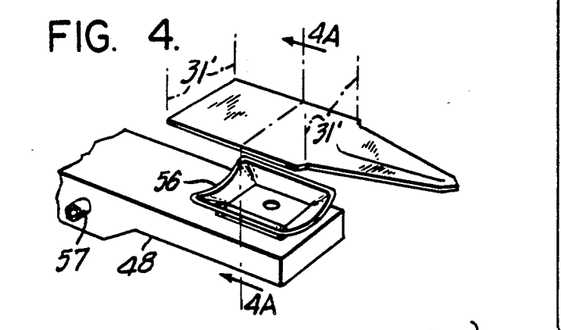
FIG. 4 is an enlarged fragmentary view in perspective to illustrate the spaced relation of a picker-arm suction cup, with respect to a tag about to be picked from a stack of tags.

The functional coaction involved in the tag-picking operation will be explained in connection with FIGS. 4, 4A and 4B. In FIG. 4, the picker arm 48 has undergone its upward rotation (on shaft 47) and is just short of making suction-cup (56) contact with the underside of the rectangular panel end of the lowermost tag 13' in its magazine; for clarity, vertical phantom lines 31' are merely suggestive of the fact that other tags of the same stack are retained in vertical array, by the inner sectional contour of the involved magazine 31. It should be explained that all tags 13 are of preferably of the variety shown at 13', being illustratively available commercially from International Master Products Corp, Montague, Mich. In such tags, the outwardly projecting tapered end is centrally creased, to create a wide-V section, for reinforcement in aid of driven implantation in soil. As shown, this V section is oriented for upward placement of the concave side of the V section, so that the upper face of the panel end of the tag is favorably predisposed for eventual shallow downward compliant concaving deformation, in aid of tag pick-off action, as will be made clear.

Figure 4A:
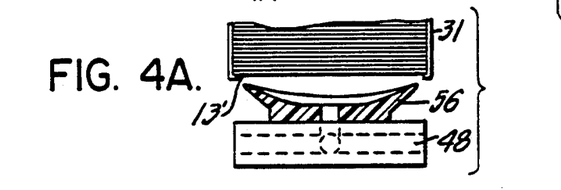
FIG. 4A is a sectional view taken at 4A—4A in FIG. 4.
Figure 4B:
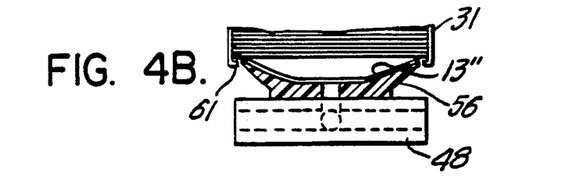
FIG. 4B is a view taken at the section 4A—4A but at an instant later, involving suction-cup engagement to the bottom tag of FIG. 4.

In FIG. 4A, the elastomeric suction cup 56 is seen to be generally rectangular, with a thin flexible peripheral lip having longitudinal-end elevation profiles which are arcuate (concave upward), as seen from the section plane 4A—4A of FIGS. 4A and 4B. At the upper end of the rotary stroke of arm 48, this flexible lip is driven into such contact with tag 13' as to slightly elevate the stack, and simultaneous actuation of a suction-cup solenoid valve 60 (FIG. 5) establishes vacuum-pump connection to all interconnected vacuum cups. The resulting action is to positively induce the panel end of tag 13' to compliantly deflect into peripherally sealed engagement with and to cup 56, such that the deflection conforms the panel end to the arcuate end profiles of the cup, thus slightly inwardly withdrawing the lateral edges of the tag with respect to their prior stacking interference with retaining lugs 61 at the lower end of magazine 31. Having thus positively engaged the lowermost tag 13' to cup 56, a solenoid valve 62 (FIG. 5) is actuated to effect compressed-air delivery to cylinder 52, for a swift pivotal downstroke of arm(s) 48, placing tag 13' in the vertically oriented implant-readiness orientation depicted in FIG. 3A.

With tag 13' thus oriented, another solenoid valve 63 (FIG. 5) is actuated to deliver compressed air to cylinder 44, for a swift vertically downward stroke of the transverse member 40 and all its picker arms 48. As seen in FIG. 3A, the stroke of cylinder 44 involves a vertical displacement D which assures clean insertion of the V-reinforced end of the involved tag 13 into the prepared soil of an individual plant cell.

Figure 5:
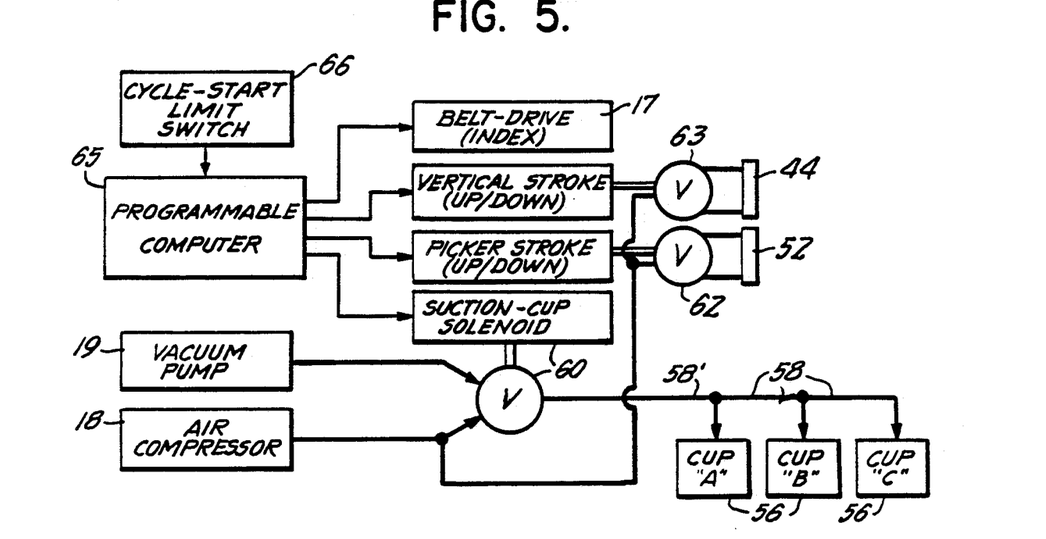
FIG. 5 is a simplified block diagram to show computer control of functional elements of the machine of FIGS. 1 and 2.
Figure 6:
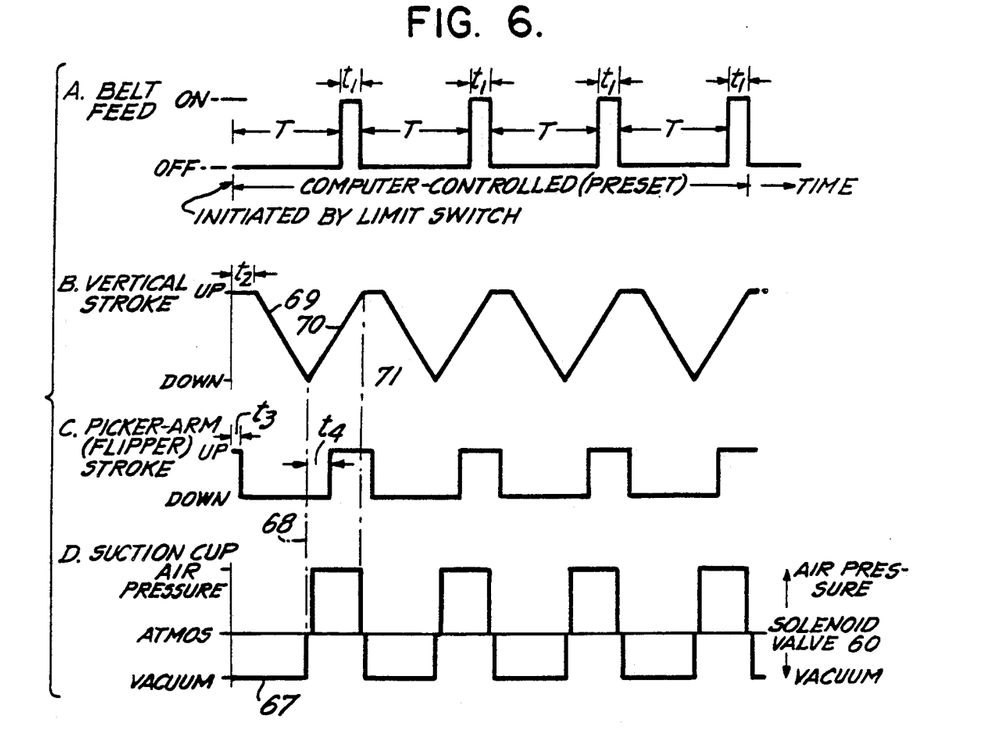
FIG. 6 is a series of graphs to the same time scale, to show the relative timing of functional elements of the machine of FIGS. 1 and 2.

A programmable computer 65 in FIGS. 5 and 6 provides automatic operation of the described tagging machine, throughout a series of multiple-tagging cycles, in accordance with the number of transverse rows of cells in a given configuration of cell-loaded trays 11, 12 to be operated upon. It is to be understood that the computer 65 has been programmed to respond to conditions and to effect events, as follows:

(a) A cycle-start limit switch 66 (FIGS. 1 and 2), mounted to a marginal guide 67 on one side of conveyor belt 10, is poised for actuation by the leading edge of the adjacent side wall of each tray 11, 12, as the same is advanced by the conveyor-belt drive 17. Such actuation of switch 66 is operative to place all belt-indexing and solenoid-valve actuations under the control of the computer program, as long as the adjacent side wall of the involved tray keeps switch 66 in its actuated position. Upon switch 66 disengagement from a given tray sidewall, the thus-unactuated condition of switch 66 re-establishes continuous drive of the conveyor belt, exclusive of computer control, and until the presence of the next-successive tray (11, 12) is detected at 66, to restart another series of computer-controlled tagging cycles.

(b) In curve A of FIG. 6, the computer-programming of conveyor-belt feed is seen to provide four short-duration periods $t_1$ of drive 17 operation (at a known constant drive speed), and four longer-duration periods T of dwell, preceding each of the intermittent drive periods $t_1$. The four periods correspond to the number of rows of cells per tray 11 (12), and the drive period $t_1$ is programmed to establish precise indexing advances that will vertically align the cells of each row, so as to receive their tag insertions close to the trailing wall of each cell, to safely avoid fouling of cell transplants.

(c) The curves of FIG. 6 are to the same time scale. Therefore, curve 13 indicates that, upon tray-actuation of switch 66, the vertical-stroke actuator (cylinder 44) remains in its "up" position for a period $t_2$ sufficient to lap the shorter period $t_3$ of picker-arm (flipper) 48 downward rotation, it being clear that a tag (13) is vacuum-retained and reoriented (from horizontal to vertical) in the course of period $t_3$, as indicated at 67 in curve D.

(d) At the instant 68 which ends the downward stroke 69 of cylinder 44 (and member 40), valve 60 is solenoid-actuated to its other state, thereby disconnecting suction-cups 56 from the vacuum pump, and releasing all picked-off tags from picker-arm connection, so that the upward stroke 70 of cylinder 44 can be initiated immediately. In said other state, valve 60 operatively connects pressurized air to the suction-cup connections 58, 58', thereby assuring against entry of foreign matter into the suction cups.

(e) At a predetermined time $t_4$ after commencing the upstroke of cylinder 44, namely, a period $t_4$ sufficient to assure picker-arm clearance of implanted tags and transplanted seedlings, the picker stroke is reversed by solenoid actuation of valve 62 so that all picker arms 48 can be horizontally extended by the time that member 40 approaches and reaches its up position. The air-pressure supply to all suction cups remains throughout this approach phase so that the air blast can also be operative to dislodge foreign matter from the underside of the next tag to be engaged.

(f) At the instant 71 of completing the upstroke of member 40, valve 60 is actuated to re-establish vacuum connections to the suction cups, thus establishing new tag engagements.

(g) During the terminal phase of the upstroke of member 40, a new conveyor-index cycle of duration $t_1$ is initiated and completed, thus setting the stage for recycling the computer-driven program which has been described, except for the fact that the new program is operative for tagging the second row of cells in the involved tray.

(h) The cycles repeat for rows of the given tray, until limit switch 66 runs off the trailing edge of the adjacent sidewall of the indexed tray, whereupon drive at 17 resumes until the next tray presence is detected.

The above-described embodiment will be seen to have achieved all stated objects. The computer 65 need only be required to deliver sequencing signals to each of a few solenoid-operated devices, namely, (i) a motor-start and run relay which will be understood to be part of the belt-drive means 17, (ii) a solenoid-operating relay for determining the respective down-drive/up-drive settings of solenoid valve 62, (iii) a solenoid-operating relay for determining the respective down-rotate/up-rotate settings of solenoid valve 63, and (iv) a solenoid-operating relay for determining the respective vacuum/pressure connections to the suction cups 56. In practice, a row-cycling time $(T+t_1)$ of one second is readily obtainable, with extremely faithful and accurate tagging of all the multiple cells in a given row.

Figures 7, 8, 9:
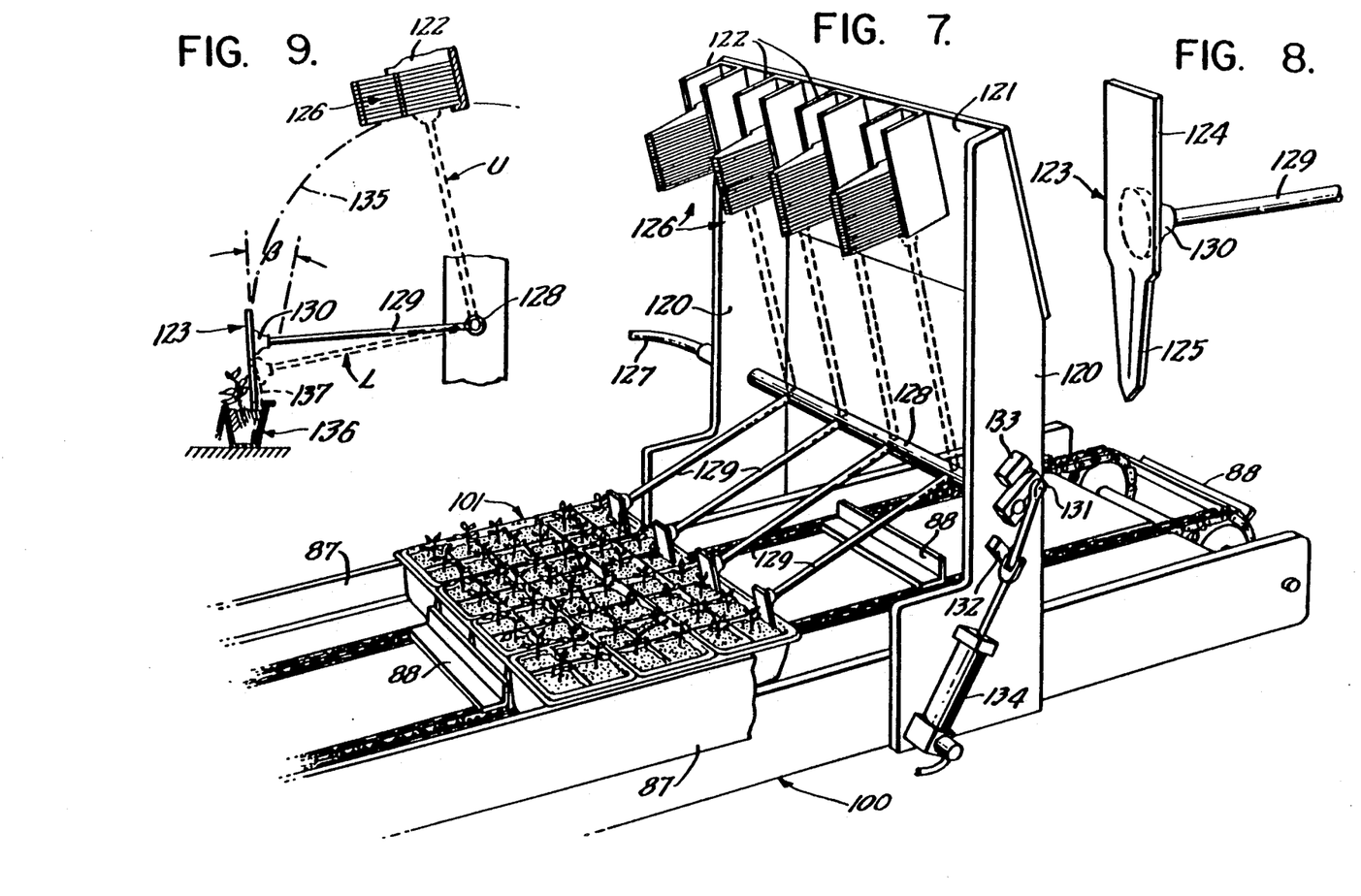
FIG. 7 is a perspective view of another tagging-machine embodiment.
FIG. 8 is an enlarged fragmentary view in perspective of one tag and its holder forming a component of the mechanism of FIG. 7.
FIG. 9 is a simplified diagram in aid of discussing operation of the tagging mechanism of FIG. 7.

FIGS. 7, 8 and 9 illustrate detail of another tagging machine, at a station along a conveyor system 100, in the context of a tray 101 containing twelve 2×2 clusters of cells, each of which contains a transplanted seedling. The tagging station comprises spaced uprights 120 secured to the machine frame on opposite sides of the conveyor system 100. An inclined upper plate 121 establishes a bridge connection of the uprights and mounts plural supply chutes 122 for gravity feed of stacks 124 of individual plant-identifying tags 123, to a stack-limiting bottom plane from which tags can be singly extracted. The spacing between chutes 122 is such as to register with the transverse positions of corresponding cells in each 2×2 cluster. For tagging purposes in the assumed case of ultimately retailing individual 2×2 clusters, only one tag is needed per cluster and computer-programming of indexing advances of the conveyor system should be set for the spacing between corresponding rows (e.g., front-rows only) of successive 2×2 clusters. On the other hand, if the tagging station of FIG. 7 is but one of several stations along a conveyor system which also includes a transplanter station as described in said application Ser. No. 259,795, wherein indexing advances are in increments of the row-to-row spacing of cells, each tagging cycle is to be understood as being illustratively computer-coordinated to occur in the first half of every other dwell between indexing displacements of the conveyor.

As seen in FIG. 8, and as in the embodiment of FIGS. 1 to 6, each tag 123 comprises a flat identification panel 124 oriented above an integrally formed spike tail 125, of V-shaped section for stiffening purposes; preferably, each tag is of sufficiently heavy-gage plastic or card material to exhibit the relatively stiffly compliant yieldability needed for tag extraction from the bottom of a stack 126 and for deflection at spike/panel juncture, in the course of spike insertion into its designated cell location, as will become clear. Single-tag extraction from the bottom of each stack 126 is by way of programmed vacuum-supply connection at 127 to a tubular manifold 128 which carries spaced tubular picker arms 129, each having an outer end that is fitted with an elastomeric suction cup 130 for selective engagement with the panel region 124 of a tag. Manifold 128 is journaled for angular rotation in both uprights 120, and is shown actuable by a crank 131, between a tag-picking upper location (dashed-line orientation of arms 129 in FIG. 7) and a tag-releasing lower location (solid-line orientation of arms 129 in FIG. 7); these locations are limited by crank stops 132, 133, respectively, and are designated U and L for phantom-line limiting orientations in FIG. 9. And a double-acting pneumatic cylinder 134 mounted to the front upright 120 drives a rod-and-link connection to the crank arm 131.

FIG. 9 illustrates that the orientation of each chute 122 is such as to downwardly slope the face of tag panel 124 at the stack bottom at an angle $\alpha$ slightly below the horizontal, such that, in approach of each arm 129 to its upper position U, the suction cup 130 has grazing, almost-tangential incidence with the panel 124 of the bottom tag. In the course of this approach, vacuum supply is cut off, but once in position U, the vacuum connection 127 is operative, to establish clean vacuum engagement to the involved panel 124. So strong is this engagement that, with the ensuing upstroke of actuator 134, manifold 128 and its arms 129 are angularly displaced for extraction of the engaged tag from its stack, and bodily rotation through an arc 135 to the lower position L. Just prior to attaining position L, the spike end 125 of the tag is shown (by solid outline) to have initial entry into the soil of its destination cell 136 at an angle $\beta$ of initial grazing incidence with the nearside inner wall of the cell, and in safe clearance relation with its newly transplanted seedling. In the course of final approach to the lower position L, spike 125 pilots along the cell wall while the spike/-panel region compliantly bends, as suggested by phantom outline at 137, whereupon the vacuum supply is cut/off, for suction-cup disengagement and for picker-arm 129 return to position U for the next tag-picking cycle.

What is claimed is:

1. A tagging machine for production-line insertion of identification tags in soil-laden transplanter cells that are indexably advanced along the production line, said machine comprising upstanding frame structure fixedly supporting a rigid chute-mounting first member spaced above and spanning the path of production-line advance; a plurality of tag-supply chutes mounted to said member in spaced relation which accords with the spacing of plural transplanter cells to be tagged in a single transversely aligned row when indexed into a tagging location, each of said chutes being adapted to retain a stack of like stiffly compliant tags for feed of the bottom surface of the bottom tag in each chute to a single downwardly facing geometric plane of pick-off and release from its stack; a rigid picker-mounting second member spanning the path of production-line advance and supported by said frame structure for vertically guided reciprocation within space between said first member and the production line, a plurality of transversely spaced picker arms carried by said second member and mounted thereto for unitary rotation about an axis transverse to the path of production-line advance; the number and spacing of picker arms according with the number and spacing of chutes such that, in a generally horizontal upper angular position of arm rotation and when said second member is in its vertically guided upper position, the outer end of each of said arms registers in pick-off relation with the bottom surface of the bottom tag of a different one of said chutes; first intermittently operative actuating means for effecting a vertically guided cycle of reciprocation of said second member wherein a first vertically down stroke precedes a second vertically up stroke of return to the upper position of said second member; second intermittently operative actuating means for effecting a cycle of rotary reciprocation of said picker arms wherein a first rotary stroke to a generally vertical picker-arm orientation precedes a second rotary stroke of return to the generally horizontal upper angular position; and synchronizing means controlling said actuating means such that the first rotary stroke is effectively completed at commencement of said first vertically down stroke and said second rotary stroke is substantially completed at completion of said second vertically up stroke.

2. The tagging machine of claim 1, in which said synchronizing means is a programmable computer.

3. The tagging machine of claim 2, in which a sensor of cell presence is fixedly mounted to the machine to produce an electrical trigger signal upon sensed production-line presence of a transplanter cell to be tagged, said sensor having an output connection to said computer for computer determination of initiation of said vertical and rotary cycles.

4. The tagging machine of claim 1, in which the production-line comprises a conveyor belt and means for incrementally advancing the same in periods between dwells, said synchronizing means being operative to determine both said vertical-reciprocation cycle and said rotary-reciprocation cycles in a single dwell period.

5. The tagging machine of claim 1, in which the outer end of each picker arm carries a flexible elastomeric suction cup for tag-registration and pick-off engagement, a controlled intermittently operative vacuum-supply connection to said suction cups via their respective arms, and said synchronizing means being operative to apply and retain vacuum conditions during an interval of said cycles, which interval commences prior to actuation of either of said first strokes and which terminates at completion of the first vertically down stroke.

6. The tagging machine of claim 5, in which the vacuum-supply connection to said suction cups includes solenoid-operated value means having two inlet connections and an outlet connection to said suction cups, a vacuum pump connected to one of said inlet connections, a source of pressurized air connected to the other of said inlet connections, said valve means being operative to supply a flow of pressurized air to said suction cups during the second vertically up stroke of said second member.

7. The tagging machine of claim 3, in which, for the case of plural like multiple-cell trays on the production-line, said sensor will produce its presence-indicating signal at onset of each tray presence, said computer being programmed in response to the presence-indicating signal to determine a plurality of tagging cycles wherein the number of tagging cycles is programmed to accord with the number of successive rows of cells in the tray, and each tagging cycle comprising both said cycles of vertical and rotary reciprocation, in interlace with computer-controlled incremental advance of the production line, said incremental advance being predetermined to accord with the cell dimension in the direction of production-line advance.

8. The tagging machine of claim 1, in which said chute-mounting first member is characterized by constant non-circular cross-section along that part of its length which spans the production-line, each of said chutes being configured for keyed and therefore non-rotating but slidable mounting along and to said first member, and selectively operable means for clamping each chute to said first member, whereby the number and spacing of chutes can be set to accord with the number and transverse center-to-center spacing of transversely arrayed cells to be tagged in each tagging cycle.

9. The tagging machine of claim 1, in which the mounting of picker arms to said second member comprises an elongate transverse rod journaled at its ends in offset but parallel relation to said second member, said picker arms being carried by and adjustably slidable along said rod for spacing to accord with the number and center-to-center spacing of transversely arrayed cells to be tagged in each tagging cycle, and means for clamping each picker arm against rotation with respect to said rod and at its adjusted transverse location, with all picker arms having the same rotary orientation with respect to said rod.

10. The tagging machine of claim 1, in which said upstanding frame structure is confined to one lateral side of the production-line, said first member having rigid cantilevering connection to said frame structure.

11. The tagging machine of claim 10, in which said production-line includes a conveyor belt and floor-based framing for conveyor-belt mounting and drive mechanism, said upstanding frame structure being a single column having at least its lower half characterized by constant non-circular cross-section, there being vertically spaced column guide means on said floor-based framing for keyed vertical guidance of the lower half of said column, and selectively operable jacking means operative between said column and said floor-based framing for adjustable elevation of said column and the chute-mounting member carried thereby.

12. The tagging machine of claim 1, in which said first actuating means is a double-acting cylinder, and pressure-fluid supply means for operating the same.

13. The tagging machine of claim 1, in which said second actuating means is a double-acting cylinder having a crank-actuating connection to said rod, and pressure-fluid supply means for operating said cylinder.

14. The tagging machine of claim 1, in which each tag-supply chute has an inner-wall tag-retaining sectional profile which is rectangular, and in which the outer end of each said picker arm carries a suction cup having an upwardly exposed generally rectangular flexible elastomeric lip which, in the horizontal upper angular position of arm rotation, is in vertical register with and fully overlapped by the tag-retaining sectional profile of a different one of said chutes, and a controlled intermittently operative vacuum-supply connection to each suction cup via its picker arm.

15. The tagging machine of claim 14, in which the end-elevation profile of two opposed ends of each suction-cup lip is generally arcuately depressed below a generally horizontal plane containing the opposed lateral sides of said lip, for each said suction-cup.

16. The machine of claim 5, in which each of the tags comprises an elongate spike end for cell entry and a panel end for suction-cup engagement.

17. A tagging machine for production-line insertion of identification tags in soil-laden transplanter cells that are indexably advanced at intervals along the production line, said machine comprising upstanding frame structure supporting a horizontal member transversely spanning the path of production-line advance, a plurality of tag-supply chutes mounted to said member in spaced relation which accords with the spacing of plural transplanter cells to be tagged in a single aligned row when indexed into a tagging location, each of said chutes being adapted to retain a stack of like stiffly compliant tags for feed of the bottom surface of the bottom tag in each chute to a single downwardly facing geometric plane of pick-off and release from its stack, a horizontal pick-off rod mounted for selective rotary reciprocation to the extent of approximately $\pi/2$ radians, an array of like picker arms connected to said rod in parallel radially extending array and at vertical-plane spacings which register with said chutes, and actuating means for rotating said rod in angular reciprocation strokes between an upper location of tag pick-up via suction-cup engagement to the bottom tag in each chute and a lower location of tag implantation in a different cell in the row of transplanter cells to be tagged, a controlled intermittently operative vacuum-supply connection to the suction cups of said picker arms, said vacuum-supply connection being controlled to apply a vacuum condition only for the interval beginning with suction-cup engagement to the bottom tag of each chute and until the instant of tag implantation in the row of transplanter cells being tagged.

18. The machine of claim 17, in which said rod is mounted for rotation about a fixed horizontal axis, and said arms pick-off said tags via sliding tangential disengagement from their respective stacks.

19. The machine of claim 17, in which said rod is mounted for rotation about a horizontal axis which is in turn mounted for vertically reciprocating displacement between (a) an upper position wherein rod actuation places said picker arms in substantially horizontal register with tags to be picked and (b) a lower position wherein rod actuation has rotated said picker arms into substantially vertical orientation for substantially vertical insertion into the transplanter cells which are thereby tagged.

20. A tagging machine for cyclical insertion of an identification tag in successive soil-laden transplanter containers that are successively advanced along a horizontal path, said machine comprising upstanding frame structure fixedly supporting a vertically oriented tag-supply magazine for containing and retaining a vertically stacked plurality of like stiffly compliant tags for feed of the bottom surface of the bottom tag in the stack to a downwardly facing substantially horizontal geometric plane of pick-off and release from its stack, a picker-mounting slide beneath said geometric plane and supported by said frame structure for vertically guided reciprocation between upper and lower limits within space between said magazine and said path, a picker arm carried by said slide and mounted thereto for rotation about an axis which is parallel to and substantially in said geometric plane, said rotation being such that in a generally horizontal upper angular position of arm rotation and when said slide is in its vertically guided upper position, the outer end of said arm registers in pick-off relation with the bottom surface of the bottom tag of said stack; first actuating means for effecting a vertically guided cycle of reciprocation of said slide wherein a first vertically down stroke precedes a second vertically upstroke of return to the upper position of said slide; second actuating means for effecting a cycle of rotary reciprocation of said picker arm wherein a first rotary stroke from an upper generally horizontal picker-arm orientation to a lower generally vertical picker-arm orientation precedes a second rotary stroke of return to the generally horizontal upper angular position; and means synchronizing the control of said actuating means such that the first rotary stroke is effectively completed at commencement of said first vertically down stroke and said second rotary stroke is substantially completed at completion of said second vertically upstroke.

21. The tagging machine of claim 20, in which the tag-supply magazine has an inner-wall tag-retaining sectional profile which is rectangular, and in which the outer end of said picker arm carries a suction cup having an upwardly exposed generally rectangular flexible elastomeric lip which, in the horizontal upper angular position of arm rotation, is in vertical register with and fully overlapped by the tag-retaining sectional profile of said magazine, and a controlled intermittently operative vacuum-supply connection to said suction cup via said picker arm.

22. The tagging machine of claim 20, in which the end-elevation profile of two opposed end of said suction-cup lip is generally arcuately depressed below a generally horizontal plane containing the opposed lateral sides of said lip.

23. A tagging machine for production-line insertion of identification tags in soil-laden transplanter cells that are indexably advanced at intervals along the production-line, said machine comprising upstanding frame members supporting a bridge transversely spanning the path of production-line advance, a plurality of tag-supply chutes mounted to said bridge in spaced relation which accords with the spacing of plural transplanter cells to be tagged in a single transversely aligned row when indexed into a tagging location, a tubular manifold having journaled support in both said frame members on a transverse axis that is parallel to said row, each of said chutes being adapted to retain a stack of like stiffly compliant tags for gravity feed of the bottom surface of the bottom tag in each chute to a single downwardly facing geometric plane of pick-off and release from its stack, an array of like tubular picker arms rigidly connected in parallel radially extending array to and internally communicating with said manifold at vertical-plane spacings which register with said chutes, a controlled intermittently operative vacuum-supply connection to said manifold, a flexible elastomeric suction cup at the outer end of each picker arm, and actuating means for rotating said manifold in angular reciprocation strokes between an upper location of tag pick-up via suction-cup engagement to the bottom tag in each chute and a lower location of tag implantation in the row of transplanter cells to be tagged; the inclination of said geometric plane in relation to the locus of suction-cup displacement being such that in approach to said upper location, each suction cup has near-tangential grazing incidence with the bottom surface of the tag to be picked; the location of the axis of manifold rotation with respect to the internal-wall surface of cells to be tagged at the tagging location being such that, in approach to the lower location of arm reciprocation, initial contact is (i) at or near said wall surface at or near the soil-fill level and (ii) with tag orientation at an angle of grazing incidence with said wall surface, such that in the course of completing displacement to said lower location, the lower end of each tag is guided by grazing contact with said wall surface and is compliantly bent in relation to the area of suction-cup engagement; said vacuum-supply connection being controlled to apply a vacuum condition for the stroke from the upper to the lower location of said arms and to release from said condition for the stroke from the lower to the upper location of said arms.

24. The machine of claim 23, in which each of the tags comprises an elongate spike end for cell entry and a panel end for suction-cup engagement.

* * * * *